US011719898B2

(12) United States Patent
Nagarajan et al.

(10) Patent No.: US 11,719,898 B2
(45) Date of Patent: Aug. 8, 2023

(54) METHODS FOR CO-PACKAGING OPTICAL MODULES ON SWITCH PACKAGE SUBSTRATE

(71) Applicant: Marvell Asia Pte Ltd., Singapore (SG)

(72) Inventors: Radhakrishnan L. Nagarajan, San Jose, CA (US); Mark Patterson, San Jose, CA (US)

(73) Assignee: Marvell Asia Pte Ltd., Singapore (SG)

( * ) Notice: Subject to any disclaimer, the term of this patent is extended or adjusted under 35 U.S.C. 154(b) by 89 days.

(21) Appl. No.: 17/190,867

(22) Filed: Mar. 3, 2021

(65) Prior Publication Data

US 2022/0283360 A1    Sep. 8, 2022

(51) Int. Cl.
*G02B 6/43* (2006.01)
*G02B 6/42* (2006.01)

(52) U.S. Cl.
CPC ............. *G02B 6/43* (2013.01); *G02B 6/426* (2013.01); *G02B 6/4214* (2013.01); *G02B 6/4246* (2013.01); *G02B 6/4257* (2013.01); *G02B 6/4261* (2013.01)

(58) Field of Classification Search
None
See application file for complete search history.

(56) References Cited

U.S. PATENT DOCUMENTS

| 7,489,514 | B2 * | 2/2009 | Hamasaki | G02B 6/3817 |
| | | | | 361/801 |
| 10,110,311 | B1 * | 10/2018 | Lin | G02B 6/4249 |
| 10,866,376 | B1 * | 12/2020 | Ghiasi | G02B 6/4292 |
| 11,178,473 | B1 | 11/2021 | Nagarajan et al. | |
| 11,218,242 | B2 | 1/2022 | Nagarajan et al. | |
| 2007/0183709 | A1 * | 8/2007 | Furuno | G02B 6/4284 |
| | | | | 385/14 |
| 2014/0010498 | A1 * | 1/2014 | Verslegers | G02B 6/30 |
| | | | | 385/37 |

(Continued)

FOREIGN PATENT DOCUMENTS

| JP | 2012145743 A | * | 8/2012 |
| WO | WO-0229465 A1 | | 4/2002 |

OTHER PUBLICATIONS

International Search Report and Written Opinion issued in corresponding International PCT Application No. PCT/US2022/018648 dated Jun. 21, 2022.

*Primary Examiner* — Michelle R Connelly (57) ABSTRACT

An assembled electro-optical switch module includes a package substrate. Four optical socket members are disposed respectively to the package substrate. Each optical socket member includes four sockets closely packed in a row. Each socket has a recessed flat region with topside land grid array (LGA) interposer connected to bottom side solder bumps and a side notch opening aligned to an edge of the package substrate at the corresponding edge region. Sixteen optical modules in four sets are co-packaged in the package substrate. Each set has four optical modules respectively seated in the four sockets of each optical socket member with top side LGA interposer. Four clamp latch members are applied to clamp each of the four sets of optical modules in respective optical socket members. A data processor device with 51.2 Tbps data interface is disposed to the package substrate and electrically coupled to each of the sixteen optical modules.

34 Claims, 6 Drawing Sheets

(56) References Cited

U.S. PATENT DOCUMENTS

| | | | |
|---|---|---|---|
| 2015/0372781 A1* | 12/2015 | Frankel | H04L 1/0053 398/79 |
| 2017/0131469 A1* | 5/2017 | Kobrinsky | G02B 6/12 |
| 2018/0259730 A1* | 9/2018 | Hochberg | H01S 5/0085 |
| 2018/0306990 A1 | 10/2018 | Badihi | |
| 2020/0249395 A1 | 8/2020 | Pezeshki et al. | |
| 2021/0048587 A1* | 2/2021 | Denoyer | G02B 6/4249 |
| 2021/0263236 A1* | 8/2021 | Janta-Polczynski | G02B 6/3885 |
| 2021/0274673 A1* | 9/2021 | Blackburn | H05K 7/1069 |
| 2022/0179159 A1* | 6/2022 | Wu | G02B 6/4214 |

* cited by examiner

METHODS FOR CO-PACKAGING OPTICAL MODULES ON SWITCH PACKAGE SUBSTRATE

BACKGROUND OF THE INVENTION

The present invention relates to optical telecommunication techniques. More particularly, the present invention provides a co-packaged optical module in 3.2 Tbits/s or more capacity with dual strategy for fiber coupling and a method for assembling multiple co-packaged optical modules with a switch die on a single package substrate.

As science and technology are updated rapidly, processing speed and capacity of the computer increase correspondingly. The communication transmission or reception using the traditional cable is limited to bandwidth and transmission speed of the traditional cable and mass information transmission required in modern life causes the traditional communication transmission overload. To correspond to such requirement, the optical fiber transmission system replaces the traditional communication transmission system gradually. The optical fiber communication is chosen for systems requiring higher bandwidth and longer distance that electrical cable cannot accommodate. Present electronic industrial performs research toward optical transmission which will become the mainstream in the future even for short distance communication. Said optical communication is a technology in that light wave functions as signal carrier and transmitted between two nodes via the optical fiber. An optical communication system includes an optical transmitter and an optical receiver. By the optical transceiver, the received optical signal can be converted to an electrical signal capable of being processed by an IC, or the processed electrical signal can be converted to the optical signal to be transmitted via optical fiber. Therefore, objective of communication can be achieved.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs. 40-Gbit/s and then 100-Gbit/s data rates wide-band WDM (Wavelength Division Multiplexed) optical transmission over existing single-mode fiber is a target for the next generation of fiber-optic communication networks. More recently, optical components are being integrated on silicon (Si) substrates for fabricating large-scale silicon photonics integrated circuits that co-exist with micro-electronic chips. Chip-scale lasers packaged directly within silicon photonics opto-electrical system have been of interest for many applications such as wide-band DWDM communication and wavelength-steered light detection. A whole range of photonic components, including filters, (de)multiplexers, power splitters, modulators, and photodetectors, have been demonstrated, mostly in the silicon-on-insulator (SOI) platform. The SOI platform is especially suited for standard DWDM communication bands around 1550 nm or CWDM communication band around 1310 nm, as silicon (n=3.48) and its oxide $SiO_2$ (n=1.44) are both transparent, and form high-index contrast, high-confinement waveguides ideally suited for medium to high-integration planar integrated circuits (PICs).

With the advances of optical communication technology and applications driven by the market, the demands become stronger on increasing bandwidth for optical communication and decreasing package footprint of an optical transceiver. It is more and more challenging to integrate all necessary components within smaller and smaller module package. For the state-of-art optical transceiver products, all the critical components including clock data recovery (CDRs), modulator drivers, transimpedance amplifiers (TIAs), and PLC photonics blocks having optical passives, modulators, and photo detectors, are assembled side-by-side on a same SOI-based component substrate in a 2D fashion. This approach has at least two drawbacks for developing any future optical transceiver with data rate greater than 400 G. Firstly, the side-by-side placement of the components consumes much of the board area for optical transceiver as a pluggable product or major substrate area for on-board optics product, making it very difficult to further shrink the product size. Secondly, side-by-side placement on the substrate creates longer electrical transmission length and often requires wire bonds between electrical die and photonics die, introducing more electrical loss which damages signal integrity for very high data rate transceiver product, e.g., >56 Gbaud symbol rate. In particular, the wire bonds lead to impedance mismatch due to large inductance, degrading the signal at higher frequencies. As such, it is not practical to use wire bonds as electrical interconnect between chips or between chips and board for the applications where high frequency (e.g., >40 GHz) analog signal is transmitted. The large inductance of wire bonds has become a bottle neck of high-speed data transmission.

To shorten the interconnect length of conventional wire bonds between electronics devices (e.g., from modulator driver/TIA to digital signal processor DSP) or between electronics (driver/TIA) and photonics (e.g., CDR and PAM4 ASIC), people have started to use through-silicon via (TSV) process and silicon photonics interposer in silicon photonics die to replace wire bonds and make interconnections. With the advancement of silicon TSV manufacturing process for making silicon photonics components and integrating active components with wafer-level assembly and burn-in testing, a co-packaged electro-optical module and switch system is desired to allow a very short interconnect length between electro-optical switch data processor and multiple light engines, providing great high-performance benefit at substantially large bandwidth capacity for high-speed data communication.

BRIEF SUMMARY OF THE INVENTION

The present invention relates to optical telecommunication techniques. More particularly, the present invention provides a co-packaged optical module in 3.2 Tbits/s or more capacity with dual strategy for fiber coupling and a method for assembling multiple co-packaged optical modules with a data processor on a single package substrate. Merely by example, the present invention discloses an optical module integrated on a single silicon photonics substrate with dual strategy of vertical coupling for power of multiple external CWDM lasers and edge coupling for signals from optical fibers to MUX/DEMUX PLC circuits for multiple optical channels with 3.2 or more Tbit/s capacity for signal transceiving, a method for assembling each of the multiple co-packaged optical modules with a data processor on a switch package substrate to form a 51.2 T electro-optical switch module high high-speed data communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 3 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides an assembled electro-optical switch module. The assembled electro-optical switch module includes a package substrate including build-in multiple routing layers with mounting sites at least in four edge regions and a central region. Additionally, the assembled electro-optical switch module includes four optical socket members disposed respectively to the mounting sites in the four edge regions. Each optical socket member includes four sockets closely packed in a row, each socket having a recessed flat region with topside land grid array (LGA) interposer connected to bottom side solder bumps and a side notch opening aligned to an edge of the package substrate at the corresponding edge region. The assembled electro-optical switch module further includes sixteen optical modules in four sets co-packaged in the package substrate. Each set has four optical modules respectively seated in the four sockets of each optical socket member, each optical module being packaged with a lid cover member to enclose a multi-channel optical transceiver with dual strategy for fiber coupling on one tile base member to form electrical contacts with the topside LGA interposer. Furthermore, the assembled electro-optical switch module includes four clamp latch members. Each clamp latch member is applied from one edge region to clamp a set of four optical modules in the recessed flat regions in respective four sockets of one optical socket member. Moreover, the assembled electro-optical switch module includes a data processor device disposed to the mounting site in the central region of the package substrate and electrically coupled via the multiple routing layers to each of the sixteen optical modules.

In a specific embodiment, the present invention provides a method for assembling a co-packaged electro-optical switch module. The method includes a step of providing a package substrate in square shape with a minimum rule of lateral dimension configured with build-in multiple routing layers connected to mounting sites at least in four edge regions and a central region. Additionally, the method includes a step of disposing four optical socket members respectively to the mounting sites in the four edge regions. The method further includes a step of co-packaging sixteen optical modules in four sets in the package substrate with each set of four optical modules respectively being seated in the four sockets of each optical socket member. Each optical module is packaged with a lid cover member to enclose a multi-channel optical transceiver with dual strategy for fiber coupling on one tile base member. Furthermore, the method includes a step of applying each of four clamp latch members from one of the four edge regions to clamp one set of four optical modules respectively in the recessed flat regions of the four sockets of one optical socket member. Moreover, the method includes a step of disposing a data processor device to the mounting site in the central region of the package substrate. The data processor device is electrically coupled via the multiple routing layers to each of the sixteen optical modules.

In another specific embodiment, the present invention provides an optical module for being co-packaged in an integrated electro-optical switch. The optical module includes a tile base member. The optical module further includes a silicon photonics chip mounted on top side of the tile base member. The silicon photonics chip includes a receive path and a transmit path of the multi-channel optical transceiver in waveguide form including silicon MZM modulators, germanium or silicon-germanium photodiodes, optical couplers in surface grating form and couplers at chip edge. Additionally, the optical module includes a driver (DRV) chip, a transimpedance amplifier (TIA) chip, a controller (CTR) chip, and a digital signal processing (DSP) chip disposed in a chip-on-wafer-on-substrate process to be associated with either the receive path or the transmit path of the multi-channel optical transceiver. The optical module further includes a first planar light circuit (PLC) block and an optical reflector coupled with a first set of optical fibers to provide laser light from external laser sources incorporated into the silicon photonics chip in near-vertical direction via the optical couplers in surface grating form. Furthermore, the optical module includes a second PLC block coupled with a second set of optical fibers to align with silicon waveguides in the silicon photonics chip via couplers at chip edge to deliver input optical signals to the receive path of the multi-channel optical transceiver or deliver output optical signals from the transmit path of the multi-channel optical transceiver. The optical module further includes a boot member holding both the first set of optical fibers and a second set of optical fibers. Moreover, the optical module includes a lid cover member disposed over the tile base member and covered with the boot member to enclose all chips associated with the multi-channel optical transceiver, the first PLC block and the optical reflector, and the second PLC block.

The present invention achieves these benefits and others in the context of known integrated electro-optical communication platform. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to optical telecommunication techniques. More particularly, the present invention provides a co-packaged optical module in 3.2 Tbits/s capacity with dual strategy for fiber coupling and a method for assembling multiple co-packaged optical modules with a data processor on a single package substrate. Merely by example, the present invention discloses an optical module integrated on a single silicon photonics substrate with dual strategy of fiber coupling, a vertical coupling for power from one set of optical fibers connected to multiple external CWDM lasers and an edge coupling for signals from another set of optical fibers connected to MUX/DEMUX PLC circuits for multiple optical channels with 3.2 or more Tbit/s capacity for signal transceiving, a method for assembling each of the multiple co-packaged optical modules with a data processor on a switch package substrate to form a 51.2 T electro-optical switch module high high-speed data communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, vertical, and edge have been used for convenience purposes only and are not intended to imply any particular fixed direction. Instead, they are used to reflect relative locations and/or directions between various portions of an object.

In an aspect, the present disclosure provides a co-packaged optical module based on silicon photonics platform with dual fiber coupling strategy with 3.2 Tbit/s or higher capacity and a 51.2 T electro-optical switch module assembly of multiple 3.2 T co-packaged optical modules with one switch data processor die on a single package substrate for various interconnect ranges of data communication. As data transmission-capacities increase in WDM systems, demand on high-speed, compact optical transceiver based on silicon photonics platform increasingly attract more and more interests over the recent years. For example, a pluggable optical transceiver in compact form factor. Alternatively, a compact optical transceiver is provided as a co-packaged optical module on a silicon photonics substrate via 2.5D/3D silicon photonics interposer containing one or more digital signal processor chips, transimpedance amplifier chip, driver chips and laser chips. Optionally, the packaged optical transceiver can be provided with one or more external laser sources via vertical coupling of dual fiber coupling strategy for providing power. Optionally, the co-packaged optical transceiver can be provided with multi-channel input/output optical signals from optical fibers via edge coupling with passive optical devices like Mux/Demux devices in a PLC block. Optionally, multiple such co-packaged optical transceivers can be assembled with an electrical switch/processor chip on a single package substrate of a dimension about 90 mm to 150 mm to form an assembled electro-optical switch module for high-speed data communication.

Figure 1:
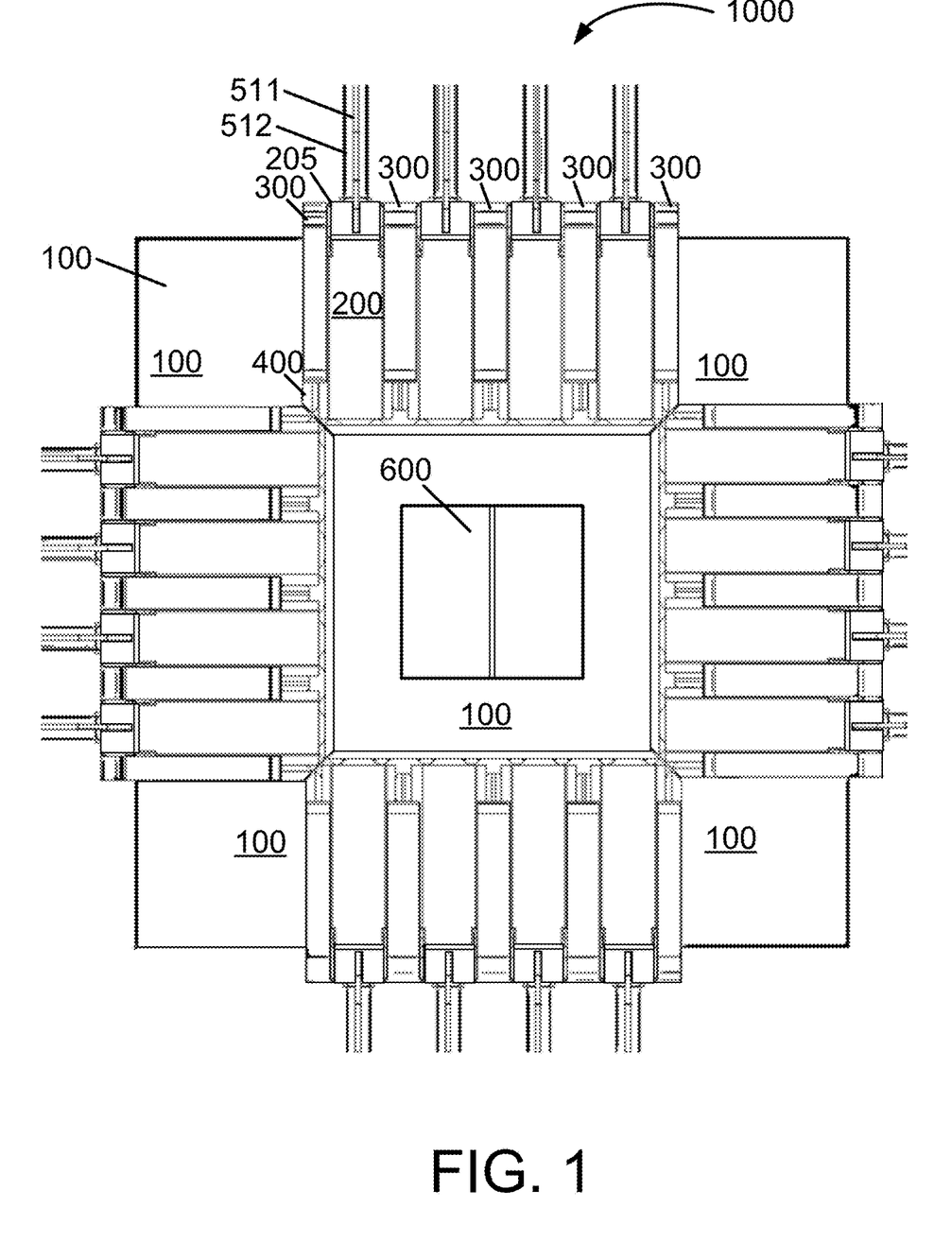
FIG. 1 is a top-view diagram of an assembled electro-optical switch module including multiple co-packaged optical modules with dual strategy for fiber coupling co-packaged with a data processor device on a switch package substrate according to an embodiment of the present invention.

FIG. 1 is a top-view diagram of an assembled electro-optical switch module including multiple co-packaged optical modules with dual strategy for fiber coupling co-packaged with a data processor device on a switch package substrate according to an embodiment of the present invention. This diagram is merely an example, which should not unduly limit the scope of the claims. One of ordinary skill in the art would recognize many variations, alternatives, and modifications. As shown, the assembled electro-optical switch module 1000 includes 16 co-packaged optical modules (e.g., 200) with a data processor chip 600 co-packaged on a switch package substrate 100. Optionally, the package substrate is provided as an organic substrate with N-2-N (N>4) buildup layers including four or more routing layers for extra short reach (XSR) or PAM optical reach (POR) SerDes data interfaces with co-packaged optical modules. Optionally, the switch package substrate 100 is in a rectangular shape with a central region for disposing the data processor device 600.

In a specific embodiment, the switch package substrate 100 is a square shape so that each of four edge regions of the switch package substrate 100 is provided for disposing 4 co-packaged optical modules 200 symmetrically. In an embodiment, an optical socket member 230 is firstly placed at one edge region. The optical socket member 400 includes 4 socket sites respectively for seating the 4 co-packaged optical modules 200. A clamp latch member 300 is made by metal sheet and used to clamp the 4 co-packaged optical modules 200 inside the 4 socket sites of the optical socket member 400. The clamp latch member 300 includes a bottom clamp part in a solid sheet form, a top clamp spart in five finger-like sheets, and a curved part connecting one end of the bottom clamp part and the top clamp part and leaving another end as an open end. When the open end of the clamp latch member 300 is sliding in clamping position, the bottom clamp part is to slide to the bottom side of the switch package substrate 100 while the top clamp part with fiber fiber-like sheets presses the 4 co-packaged optical modules 200 firmly in the respective 4 socket sites of the optical socket member 400.

In the specific embodiment that the switch package substrate 100 is provided as a square shape, each edge region allows one optical socket member 400 to be placed. Providing that each optical socket member 400 includes 4 sockets and each socket can hold one co-packaged optical module 200, the switch package substrate 100 can be shared with 16 co-packaged optical modules 200. Optionally, the switch package substrate 100 is provided as a square shape with a dimension of about 120 mm or less for holding the 16 co-packaged optical modules 200 each with 3.2 Tbps data capacity to give total 51.2 Tbps capacity for the assembled electro-optical switch module 1000 (FIG. 1). Optionally, the switch package substrate 100 is provided as a rectangular shape with a dimension in a range of about 90 mm to 150 mm.

Optionally, each optical socket member includes 2 sockets for supporting two co-packaged optical modules each with 6.4 Tbps data capacity (this represents two instances of the co-packaged optical modules 200 shown in FIG. 1). For this version of assembly, the switch package substrate 100 can be provided as a square shape with a dimension of about 90 mm to 120 mm.

In an embodiment, each co-packaged optical module 200 is configured with a dual strategy of fiber coupling including using a vertical coupling element to couple with a first set of optical fibers 511 for delivering power from external laser sources to the optical module and using an edge coupling element to couple with a second set of optical fibers 512 for receiving/delivering input/output optical signals to/from the optical module. Both the first set of optical fibers 511 and the second set of optical fibers 512 are respectively held in a first fiber cable and a second fiber cable supported by a boot member 205. The boot member 205 is fixed at an outlet of a lid cover member of the co-packaged optical module 200. Optionally, each co-packaged optical module 200 is an integrated multi-channel optical transceiver with an optical line interface configured with 4-wavelength CWDM lasers modulated to convert N lanes of electrical data into optical signals in M lines or M channels. Optionally, M=16 or 32. Optionally, the 4 CWDM lasers are delivered via the first set of four fibers from four external laser sources into the optical transceiver. Optionally, eight external laser sources are used to deliver 8 lasers through the first set of 8 fibers. Optionally, the vertical coupling element includes a first planar light circuit (PLC) block containing some optical power splitters for splitting light from the four external laser sources carried by the first set of optical fibers 511 to 8 or 16 channels incorporated into the co-packaged optical module 200. Optionally, the edge coupling element includes a second PLC block containing a plurality of multiplexers and demultiplexers configured handle multiple channels of input/output optical signals of the optical module. For example, sixteen of total 32 optical channels carrying output optical signals are transmitted via eight 2×1 multiplexers formed in the second PLC block to eight output fibers in the second set of optical fibers 512. Also, sixteen of the total 32 optical channels carrying input optical signals are received via eight 1×2 demultiplexers in the second PLC block from eight input fibers in the second set of optical fibers 512. Optionally, the first set of optical fibers 511 and the second set of optical fibers 512 are provided as two optical fiber cable pigtails terminated with optical connectors (which is not fully shown in this figure).

Optionally, the co-packaged optical module 200 is configured to include a silicon photonics chip integrating one or more modulator driver chip and one or more Transimpedance Amplifier (TIA) chips flip mounted via silicon photonics interposer or embedded directly in a silicon photonics substrate. Optionally, the co-packaged optical module 200 is configured to mount the silicon photonics chip, one or more digital signal processing (DSP) chips containing the electrical host interface, and multiple DC blocks via 2.5D/3D heterogeneous integration on a same organic substrate based on on-board-optics technology.

Optionally, the assembled electro-optical switch module 1000 includes one or more power supply domains incorporated on the switch package substrate 100 for supplying power for each co-packaged optical module 200 and data processor device 600. Optionally, an external power supply is configured to supply power (e.g., 8V) to internal Avalanche photodiodes in a receiver sub-module of the co-packaged optical module 200. Optionally, an external power supply is configured to supply power (e.g., 5V) to a driver for drive silicon modulator in a transmitter sub-module of the co-packaged optical module 200. Optionally, an external power supply is configured to supply power (e.g., 1.2V or 3.3V) to an analog (plus a microcontroller) controller in each co-packaged optical module 200. Optionally, an external power supply is configured to supply power (e.g., 0.75V, or 0.9V, or 1.2V or 3.3V) to a digital signal processor in each co-packaged optical module 200. Optionally, an external power supply is configured to supply power (e.g., 3.3V) to a transimpedance amplifier chip in each co-packaged optical module 200.

Figure 2:
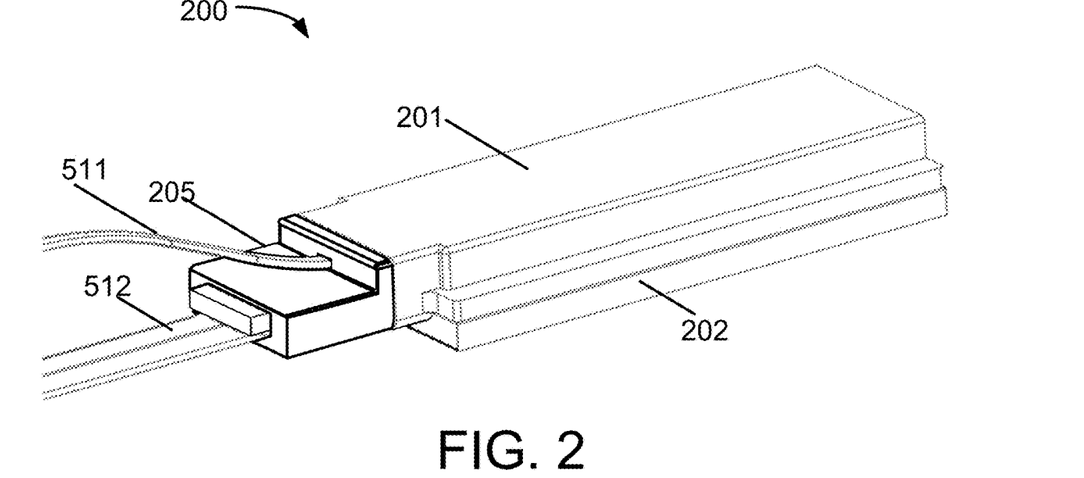
FIG. 2 is a perspective-view diagram of one of the multiple co-packaged optical modules with a lid cover member according to an embodiment of the present invention.

FIG. 2 is a perspective-view diagram of one of the multiple co-packaged optical modules with a lid cover member according to an embodiment of the present invention. This diagram is merely an example, which should not unduly limit the scope of the claims. One of ordinary skill in the art would recognize many variations, alternatives, and modifications. In an embodiment, the co-packaged optical module 200 is provided with a lid cover member 201 over a tile base member 202. At the outlet of the lid cover member 201, a boot member 205 is configured to hold two fiber cables, one fiber cable for holding the first set of fibers 511 that carries laser light from external laser sources and another fiber cable for holding the second set of fibers 512 that carries input/output light signals. Optionally, the first set of fibers 511 includes 4 fibers held in one fiber cable respectively coupled to four external laser sources.

Optionally, the first set of fibers 511 includes 8 fibers respectively coupled to eight external laser sources. Optionally, the second set of fibers 512 includes 16 fibers in one fiber cable, or 8 input fibers in one cable and 8 output fibers in another cable, carrying signals for 16 input and 16 output optical channels. Optionally, the lid cover member 201 is a metal piece and the tile base member 202 is an organic substrate with built-in electric routing wires and surface contacts.

Figure 3:
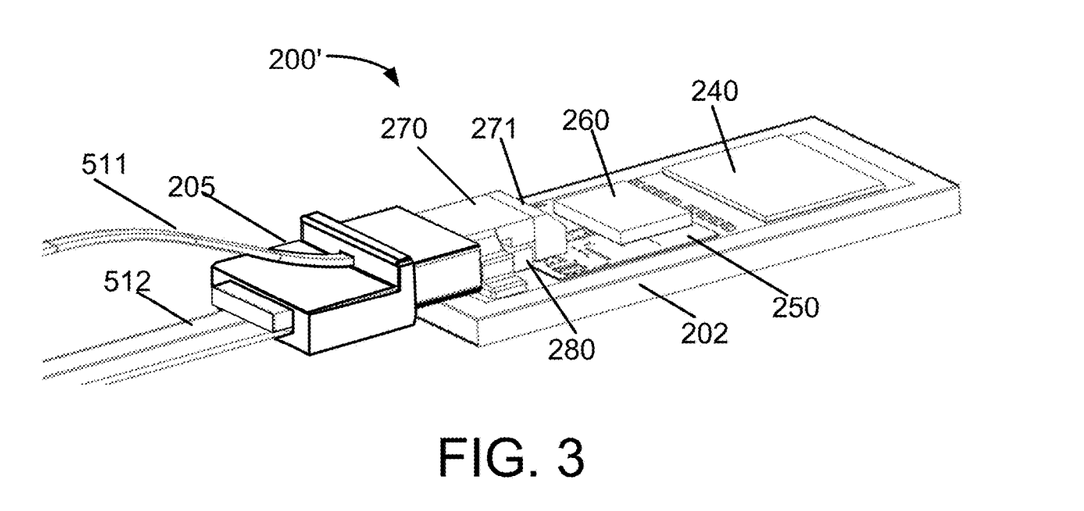
FIG. 3 is a perspective-view diagram of the co-packaged optical module of FIG. 2 without the lid cover member according to an embodiment of the present invention.

FIG. 3 is a perspective-view diagram of the co-packaged optical module of FIG. 2 without the lid cover member according to an embodiment of the present invention. This diagram is merely an example, which should not unduly limit the scope of the claims. One of ordinary skill in the art would recognize many variations, alternatives, and modifications. The co-packaged optical module 200' is substantially the co-packaged optical module 200 of FIG. 2 without the lid cover member. Referring to FIG. 3, the co-packaged optical module is revealed with some features on a topside of the tile base member 202 after the lid cover member (201) being removed. Optionally, the tile base member 202 is an organic substrate configured for packaging the co-packaged optical module and assembling it with a switch substrate or a printed circuit board directly or through a socket member for forming an assembled electro-optic module. The co-packaged optical module 200' is configured as a multi-channel optical transceiver including a digital signal processing (DSP) chip 240 flip-mounted on the topside of the tile base member 202. Additionally, the co-packaged optical module 200' includes a silicon photonics chip 250 mounted also on the topside of the tile base member 202. The silicon photonics chip 250 integrates one or more transimpedance amplifier (TIA) chips built-in or embedded therein (not explicitly shown in the FIG. 3) and one or more analog (optionally combined with a microcontroller) control chips 260 mounted thereon. The silicon photonics chip 250 also is configured as a silicon interposer to couple one or more control chips 260 thereon electrically with the tile base member 202 below. Optionally, the silicon photonics chip 250 includes multiple silicon waveguides, silicon MZM modulators, germanium or silicon-germanium photodiodes, optical couplers in surface grating form and at chip edge and other photonics devices in a receive path and a transmit path formed via a chip-on-wafer-on-substrate fabrication and packaging process.

Referring to FIG. 3, the dual fiber coupling strategy of the co-packaged optical module 200' is achieved firstly by a vertical coupling element having a first PLC block 270 to couple with the first set of optical fibers 511 to receive laser light and an optical reflector 271 to deflect the laser light in vertical angle to incident toward multiple surface grating couplers (not visible in the figure) in a silicon photonics chip 250 for delivering laser power to the multi-channel optical transceiver. Optionally, the first PLC block 270 includes multiple optical power splitters 513 in planar waveguide form, each being configured in planar waveguide form to split laser light from one fiber into two or more branches. Secondly, the dual fiber coupling strategy of the co-packaged optical module 200' is achieved by an edge coupling element including a second PLC block 280 for coupling signal light into/from the second set of fibers 512. Optionally, the edge coupling element is formed with V-groove alignment structures at an edge to align fibers for coupling with planar waveguides in the second PLC block 280. Optionally, the planar waveguides built in the second PLC block 280 contain multiple demultiplexers and multiplexers configured for or more optical channels for matching total 16 or more optical lines (8 TX and 8 RX) provided in the second set of fibers 512 as the optical interface of the multi-channel optical transceiver. Furthermore, the planar waveguides in the second PLC block 280 are directly coupled from an edge of the silicon photonics chip 250 with the silicon waveguides built therein.

Referring to FIGS. 1, 2, and 3, the tile base member 202 of the co-packaged optical module 200 is designed to meet a minimum rule of the switch package substrate 100 as four co-packaged optical modules 200 are closely packed and disposed in the optical socket member 400 in each edge region. Optionally, the tile base member 202 is provided at a dimension of about 15×30 mm or less for a co-packaged optical module 200 configured with 32 channels optical transceiver for 3.2 Tbps data communication capacity to be co-packaged on a switch package substrate of a minimum dimension in a range of about 90 mm to 150 mm. For the same instance of 3.2 Tbps co-packaged optical module 200, a corresponding silicon photonics chip 250 is provided with a dimension of about 10×10 mm or less. Two DSP chips are included per one such co-packaged optical module, each with a dimension of about 6×11 mm or less. Optionally, a bigger tile base member of about 25×27 mm can be served for a 6.4 Tbps co-packaged optical module, which is configured to be two instances of 3.2 Tbps module. As two 6.4 Tbps co-packaged optical modules are disposed to each of four edge regions, a slightly smaller switch package substrate can support total eight 6.4 Tbps co-packaged optical modules in a similar packaging scheme.

Figure 4:
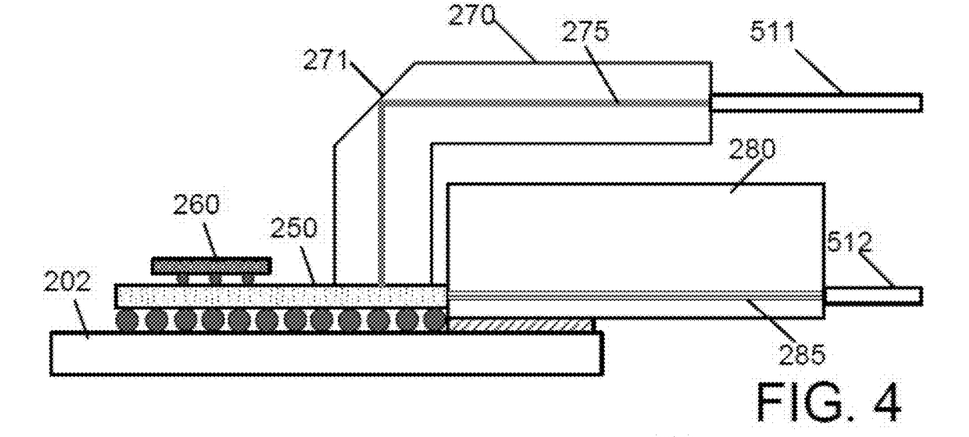
FIG. 4 is a schematic cross-sectional view of a dual strategy for fiber coupling in the co-packaged optical module according to an embodiment of the present invention.

FIG. 4 is a schematic cross-sectional view of a dual strategy for fiber coupling in the co-packaged optical module according to an embodiment of the present invention. This diagram is merely an example, which should not unduly limit the scope of the claims. One of ordinary skill in the art would recognize many variations, alternatives, and modifications. As shown, the cross-sectional view of the co-packaged optical module shows the silicon photonics chip 250 is embedded in the topside of the tile base member 202, an organic substrate, and coupled with a first PLC block 270 to receive laser light from the first set of fibers 511 and a reflector 271 to guide the laser light in top-down direction into the silicon photonics chip 250 and coupled with the second PLC block 280 in horizontal-side direction to receive or deliver optical signals from or into the second set of fibers 512. The first PLC block 270 is configured to couple laser light 275 coming from the first set of fibers 511. Optionally, the first PLC block 270 is coupled with an optical reflector 271 having an angled facet to reflect the laser light from a horizontal input direction to a nearly vertical direction and guide it to surface grating couplers (not shown) in the surface of the silicon photonics chip 250. Optionally, the first PLC block 270 includes multiple optical power splitters to split laser light from each fiber into multiple branches with reduced power in each branch. The laser light, after coupled into the silicon photonics chip 250 via the surface grating couplers, can be guided by several silicon waveguides into respective silicon modulators built in the silicon photonics chip 250 and controlled by a driver chip and controller chip 260.

The second PLC block 280 includes multiple multiplexer devices and demultiplexer devices in planar waveguides coupled with the silicon waveguides in the silicon photonics chip 250 and optical fibers 512 via an edge coupling mechanism to receive light signal from the input fibers of the second set of fibers 512 into planar waveguides (demultiplexer devices) or output light signals from the planar waveguides (multiplexer devices) to the output fibers of the second set of fibers 512. Optionally, the second PLC block 280 is coupled with the silicon photonics chip 250 to deliver the input light signals coming to some photodetectors and having optical signal being converted to electrical signals coupled into one or more transimpedance amplifier (TIA) chips.

Optionally, the TIA chips are mounted on the surface of the silicon photonics chip 250 as the driver (DRV) chip, controller (CTR) chip, and a digital signal processing (DSP) chip are mounted commonly on the organic substrate 202. Optionally, the TIA chips can be embedded inside the organic substrate 202. Optionally, the TIA chip and DRV chip are mounted on the silicon photonics chip 250 while the CTR chip and DSP chip are commonly mounted with the silicon photonics chip 250 on the organic substrate 202. Optionally, the DRV chip can be embedded inside the DSP chip before being mounted on the organic substrate 202 while the controller chip is mounted on the silicon photonics chip 250 before being mounted on the organic substrate 202. Optionally, the driver chip can be embedded in the DSP chip before being mounted on the surface of silicon photonics chip 250. Optionally, the controller chip as well as the silicon photonics chip 250 are mounted together on the organic substrate 202 while the TIA chip is embedded the organic substrate 202. Optionally, chip mounting is realized by using solder bumps and interposers or other surface mounting techniques.

Figure 5:
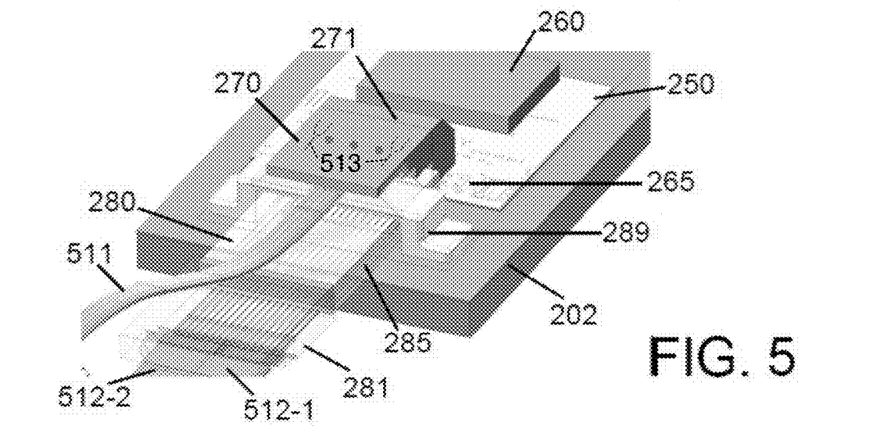
FIG. 5 is a perspective-view of the co-packaged optical module of FIG. 3 with a dual strategy for fiber coupling according to an embodiment of the present invention.

FIG. 5 is a perspective-view of the co-packaged optical module of FIG. 3 with a dual strategy according to an embodiment of the present invention. This diagram is merely an example, which should not unduly limit the scope of the claims. One of ordinary skill in the art would recognize many variations, alternatives, and modifications. As shown, the co-packaged optical module of FIG. 3 is partially shown as one embedded in a tile base member 202 which is optionally an organic substrate. A silicon photonics chip 250 is mounted or embedded in the topside of the tile base member 202. One or more transimpedance amplifier chip 265 is embedded in the silicon photonics chip 250. One or more analog (optionally combined with a microcontroller) controller chips 260 are mounted on the silicon photonic chip 250. The co-packaged optical module is configured to have one strategy for vertical fiber coupling with a first set of fibers 511 to couple external laser lights via a first PLC block 270 plus a reflector 271 as. The vertical fiber coupling has been described in FIG. 4 for coupling/splitting laser light out of a first set fibers 511 and reflecting laser light in a near-vertical direction to the surface grating couplers in the silicon photonics chip 250. An alternative strategy configured for the co-packaged optical module to couple optical signals via edge fiber coupling with a second set of fibers 512 via edge couplers 281 coupled to multiple planar waveguides 285 formed in a second PLC block 280. As shown (not in details), the second PLC block 280 is a glass substrate having multiple 1×2 or 2×2 Mux devices or Demux devices embedded therein to respectively connect eight or more input fibers in one cable 512-1 and eight or more output fibers in another cable 512-2 of the second set of fibers 512. The second PLC block 280 is clamped on the tile base member 202 by a clamping member 289 when the planar waveguides 285 are optically aligned at chip edge with silicon waveguides in the silicon photonics chip 250. Optionally, the Mux devices and Demux devices in the second PLC block 280 have 32 or more inputs from or to the silicon photonics chip 250 and 8 or more connections to the fiber set each. In this way, the second PLC block 280 is a mapping of 64 or more silicon photonics ports to 16 or more fiber ports per one co-packaged optical module.

Referring to FIG. 5, the Mux devices or Demux devices in second PLC block 280 are external devices relative to the silicon photonics chip 250. Optionally, the second PLC block 280 is formed with variations of basic AWG design. Optionally, the second PLC block 280 is formed in a high-index glass substrate or a SiN substrate. Optionally, there are 8 Mux+8 Demux devices respectively coupled to the 8 output fibers and 8 input fibers, giving 16 input channels and 16 output channels (total 32 channels) per co-packaged optical module 200. Optionally, the second PLC block 280 can be expanded to couple with 64 fibers (32 TX and 32 RX) per co-packaged optical module 200. Optionally, the first set of fibers 511 delivers 4 laser lights from external laser sources for generating 4-wavelength CWDM optical signals modulated by MZ silicon modulators within the optical module 200. Optionally, the external laser source can be a pluggable type. For example, each pluggable laser module contains 2 TOSA packaged laser devices. Optionally, the first PLC block 270 includes multiple optical power splitters in planar waveguide form. Each laser splits 8 or 4 ways. In this way, the high laser power can be reduced sufficiently when it is incorporated via surface grating couplers into silicon waveguides and silicon modulators built in the silicon photonics chip. Optionally, the co-packaged optical module 200 is configured to be an optical transceiver having 16 TX output signals being transmitted out to the network and receiving 16 RX input signals from the network with 32×100 G/λ lanes to provide 3.2 Tbit/s data capacity.

Figure 6:
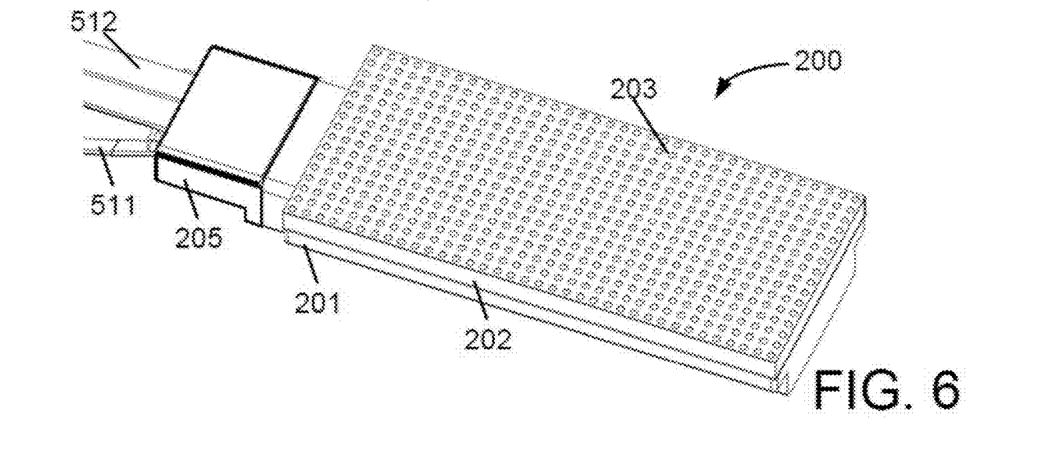
FIG. 6 is a perspective-view of bottom electrical contacts for LGA package of the co-packaged optical module of FIG. 2 according to an embodiment of the present invention.

FIG. 6 is a perspective-view of bottom electrical contacts for LGA package of the co-packaged optical module of FIG. 2 according to an embodiment of the present invention. This diagram is merely an example, which should not unduly limit the scope of the claims. One of ordinary skill in the art would recognize many variations, alternatives, and modifications. As shown is the bottom side of the tile base member 202 of the co-packaged optical module 200 described herein. The bottom side is fabricated with a plurality of electric contacts 203 configured for land grid array (LGA) package which is a type of surface-mount packaging for integrated circuits (ICs) that is notable for having the pins on a socket rather than the integrated circuit. Also visible in this figure, the co-packaged optical module 200 is provided with a lid cover member 201 (now is in back side) and an outlet for coupling two sets of fibers 511 and 512 into the module. A boot member 205 is fixed at the outlet of the lid cover member 201 to support cables of the two sets of fibers 511 and 512.

Figure 7:
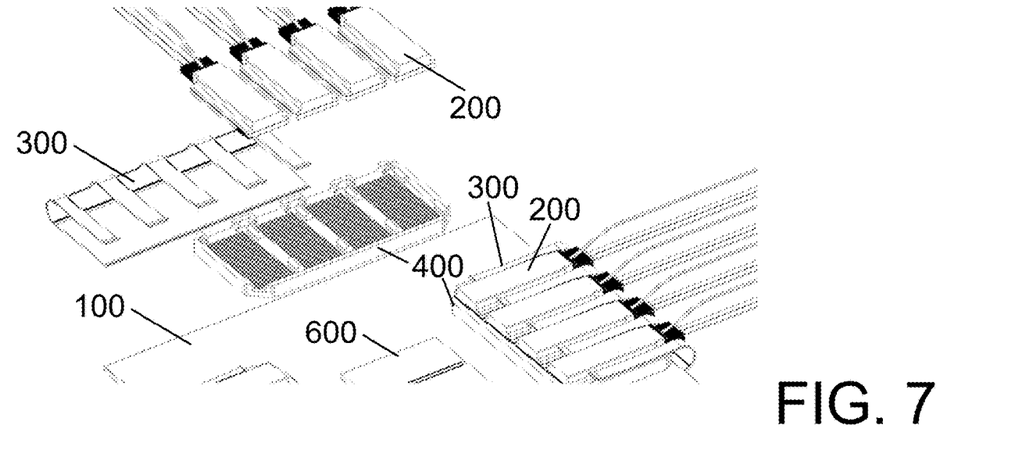
FIG. 7 is an exploded top view of a sub-assembly of multiple co-packaged optical modules of the assembled electro-optical switch module of FIG. 1 according to an embodiment of the present invention.
Figure 8:
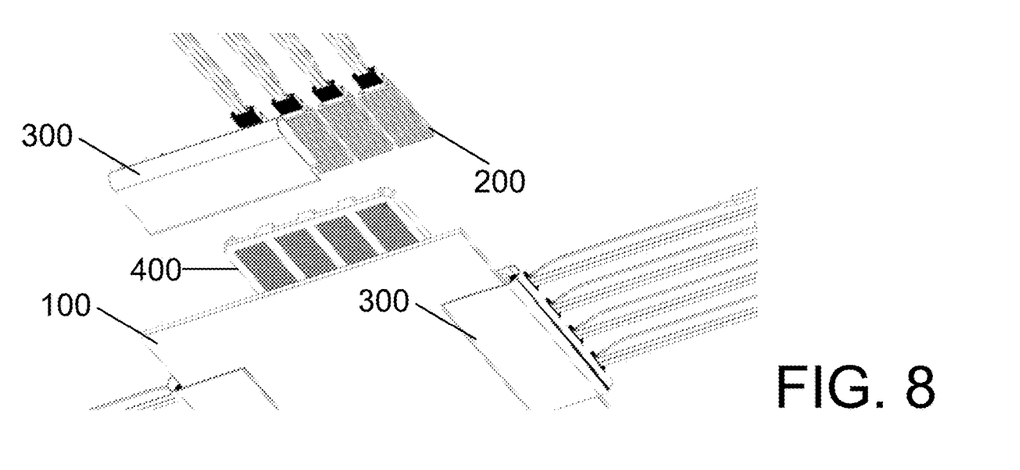
FIG. 8 is an exploded bottom view of the sub-assembly of multiple co-packaged optical modules of the assembled electro-optical switch module of FIG. 1 according to an embodiment of the present invention.
Figure 9:
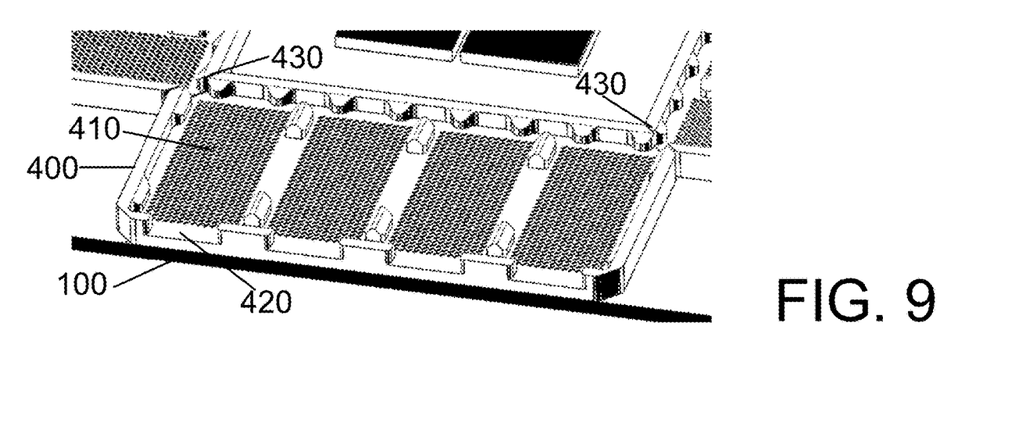
FIG. 9 is a perspective-view of an optical socket member with multiple sockets for LGA package on a switch package substrate according to an embodiment of the present invention.
Figure 10:
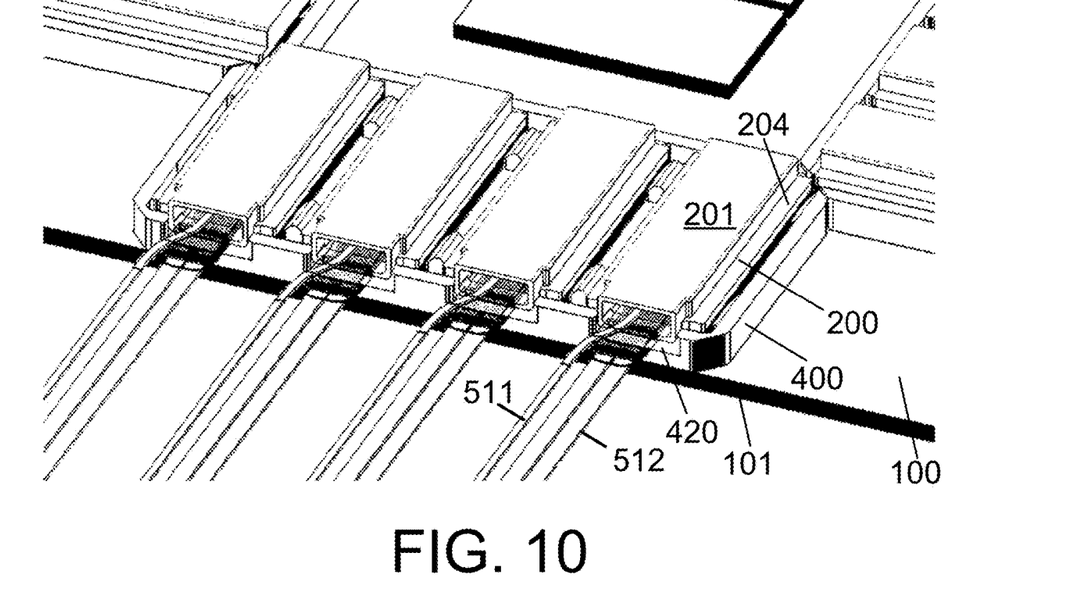
FIG. 10 is a perspective-view of multiple co-packaged optical modules disposed respectively in the optical socket member of FIG. 9 according to an embodiment of the present invention.
Figure 11:
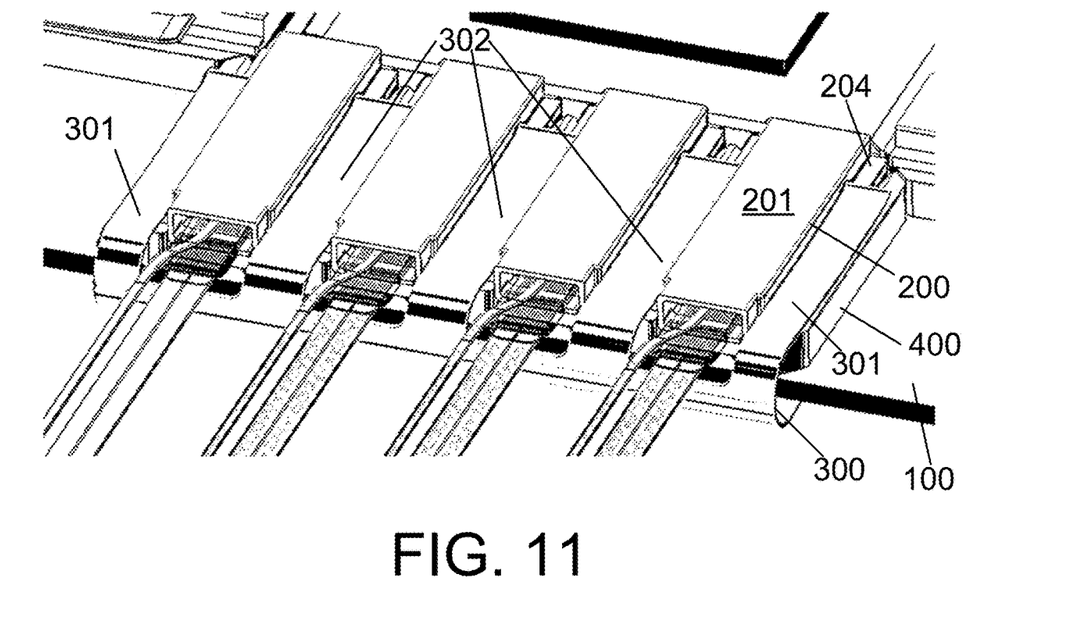
FIG. 11 is a perspective-view of multiple co-packaged optical modules in the optical sockets being clamped by a clamp latch member according to an embodiment of the present invention.

FIG. 7 is an exploded top view of a sub-assembly of multiple co-packaged optical modules of the assembled electro-optical switch module of FIG. 1 according to an embodiment of the present invention. FIG. 8 is an exploded bottom view of a sub-assembly of multiple co-packaged optical modules of the assembled electro-optical switch module of FIG. 1 according to an embodiment of the present invention. FIG. 9 is a perspective-view of an optical socket member with multiple sockets for LGA package on a switch package substrate according to an embodiment of the present invention. These diagrams are merely examples, which should not unduly limit the scope of the claims. One of ordinary skill in the art would recognize many variations, alternatives, and modifications. FIG. 10 is a perspective-view of multiple co-packaged optical modules disposed respectively in the optical socket member of FIG. 9 according to an embodiment of the present invention. FIG. 11 is a perspective-view of multiple co-packaged optical modules in the group of optical sockets being clamped by a clamp latch member according to an embodiment of the present invention. In an embodiment, a method for assembling co-packaged optical modules to form the electro-optical switch module of FIG. 1 is partially shown by FIG. 7 and FIG. 8 in exploded view, including a step of providing optical socket members as shown in FIG. 9, a step of disposing the co-packaged optical modules into the optical sockets as shown in FIG. 10, and a step of clamping the co-packaged optical modules inside the optical sockets as shown in FIG. 11.

Referring to FIG. 8, a switch package substrate 100 is provided. A data processor device 600 is mounted near central region of the switch package substrate 100. On each edge region of the switch package substrate 100, it is designed to assemble a group of co-packaged optical modules 200 respectively via an optical socket member 400. Optionally, the group of co-packaged optical modules 200 includes 4 separate modules 200 as shown. The 4 separate modules 200 are respectively designed to be seated in 4 sockets in the socket member 400 formed in one piece of material containing LGA interposer with small pitch. Each socket of the optical socket member 400 is configured to have topside LGA interposer and bottom side with bumps ready to be soldered to the switch package substrate 100. A clamp latch member 300 is employed to clamp the 4 co-packaged optical modules 200 firmly in respective 4 sockets of the optical socket member 400. A bottom clamp part of the clamp latch member 300 is designed as a solid sheet form to slide to the bottom side of the switch package substrate 100 as shown in FIG. 8. A top clamp part of the clamp latch member 300 includes five finger-like sheets each being connected via a curved part to the bottom clamp part in one end to induce an elastic force to help each finger-like sheet pressing on two side-edges of one of the 4 co-packaged optical modules 200 as they are seated in one respective optical socket 400.

Referring to another edge region of the switch package substrate in the FIG. 7, the bottom side of the optical socket member 400 can be soldered to a front plate of the switch package substrate 100 and fixed (optionally bolted down) with a backplate of the switch package substrate 100 to reinforce the LGA interposer. Optionally, the group of co-packaged optical modules includes 2 alternate modules each designed with 2 instances of 3.2 T module on a bigger tile base member while keeping total dimension similar to the package with 4-module on each edge region of switch package substrate (which may have a lightly different dimension of the switch package substrate 100). In FIG. 8, the same sub-assembly of multiple co-packaged optical modules is accomplished to a switch package substrate 100 from a bottom view angle. The bottom side of the optical socket member 400 are ready to be soldered to the top plate of the switch package substrate 100. The bottom side of each co-packaged optical modules 200 is ready to be seated into the top side of the corresponding socket of the optical socket member 400. Also shown in FIG. 8, the clamp latch member 300 is ready to slide in from its open end to allow the bottom clamp part under the switch package substrate 100 and top clamp part pressing on the seated optical modules 200 firmly in the sockets of the optical socket member 400. On one edge region (to the right side of the figure), the bottom part of the clamp latch member 300 is shown being placed at the backplate of the switch package substrate 100 with the optical modules being set in places of the optical sockets.

Referring to FIG. 9, more details of the optical socket member 400 are shown being disposed at one edge region of the switch package substrate 100. Each of four sockets in the optical socket member 400 is formed with a recessed flat region 410 having a plurality of through holes for disposing LGA interposer connecting to a plurality of solder bumps at its bottom side which allow the group of optical sockets to be soldered down to one edge region of the top plate of the switch package substrate 100. The LGA interposer is configured to have a shaped metal pin disposed in each through hole for establishing electrical connection between the to-be-seated co-packaged optical module and the switch package substrate. Each socket in the optical socket member 400 has one side notch opening 420 being horizontally leveled with the recessed flat region 410. The side notch opening 420 is located at an edge of the optical socket which is also the vertically aligned with an edge of the switch package substrate 100 as the optical socket member 400 are soldered down to the edge region of the switch package substrate 100. The side notch opening 420 of optical socket member 400 the allows room for the fiber outlet of the co-packaged optical module 200 once its bottom side is bonded with the LGA interposer installed inside the recessed flat region 410. The end portion of the co-packaged optical module 200 is configured for a boot member to hold two sets of fiber cables as well as providing room for part of two PLC blocks extended partially outside the co-packaged optical module. Optionally, the optical socket member 400 includes four sockets for supporting four co-packaged optical modules. For minimizing the total width of the optical socket member 400 for fitting with the switch package substrate 100 designed with minimum spacing rules, two corner regions 430 of this optical socket member 400 are cut off in 45 degrees to form a boundary line with another optical socket that is disposed to next edge region in 90 degrees relative to the edge region of this group of optical sockets.

Referring to FIG. 10, multiple co-packaged optical modules 200 are disposed respectively in the optical socket member 400 of FIG. 9 according to an embodiment of the present invention. The optical socket member 400 as shown is disposed along an edge 101 of the switch package substrate 100. In this embodiment, the optical socket member 400 includes 4 sockets to respective receive 4 co-packaged optical modules 200 with their lid cover member 201 being placed. Each lid cover member 201 has two ledge regions 204. Each socket has a side notch opening 420 at one edge thereof aligned with the edge 101 of the switch package substrate 100. Each co-packaged optical module 200 has a fiber outlet of the lid cover member 201 fitting in the side notch opening 420 of the socket to allow two sets of fibers 511 and 512 to couple with the co-packaged optical module 200. The first set of fibers 511 is provided as a fiber cable holding four or eight fibers to deliver laser light of 4 or 8 external laser sources into the co-packaged optical module 200. The second set of fibers 512 includes two fiber cables, one providing TX optical signal light to 8 output fibers and another providing RX optical signal light to 8 input fibers. A boot member, which is removed in this figure to show the fiber cables into the co-packaged optical module 200, will be placed at the end portion to hold the two sets of fibers 511 and 512.

Referring to FIG. 11, multiple co-packaged optical modules 200 have been disposed in positions of optical socket member of FIG. 9 in one step shown in FIG. 10 of the method for assembling the optical switch module of FIG. 1 and are further clamped by a clamp latch member 300 according to an embodiment of the present invention. The clamp latch member 300 includes fiver finger-shaped top parts being pressed on the ledge regions 204 of the four co-packaged optical modules 200. Each of three middle finger-shaped top parts 302 is pressed over two ledge regions 204 of two neighboring optical modules 200. Each of two end finger-shaped top parts 301 is pressed over one ledge region 204 corresponding to two modules at respective two ends of the group of four co-packaged optical modules 200. The bottom part of the clamp latch member 300 is slide to underneath of the switch package substrate 100.

Figure 12:
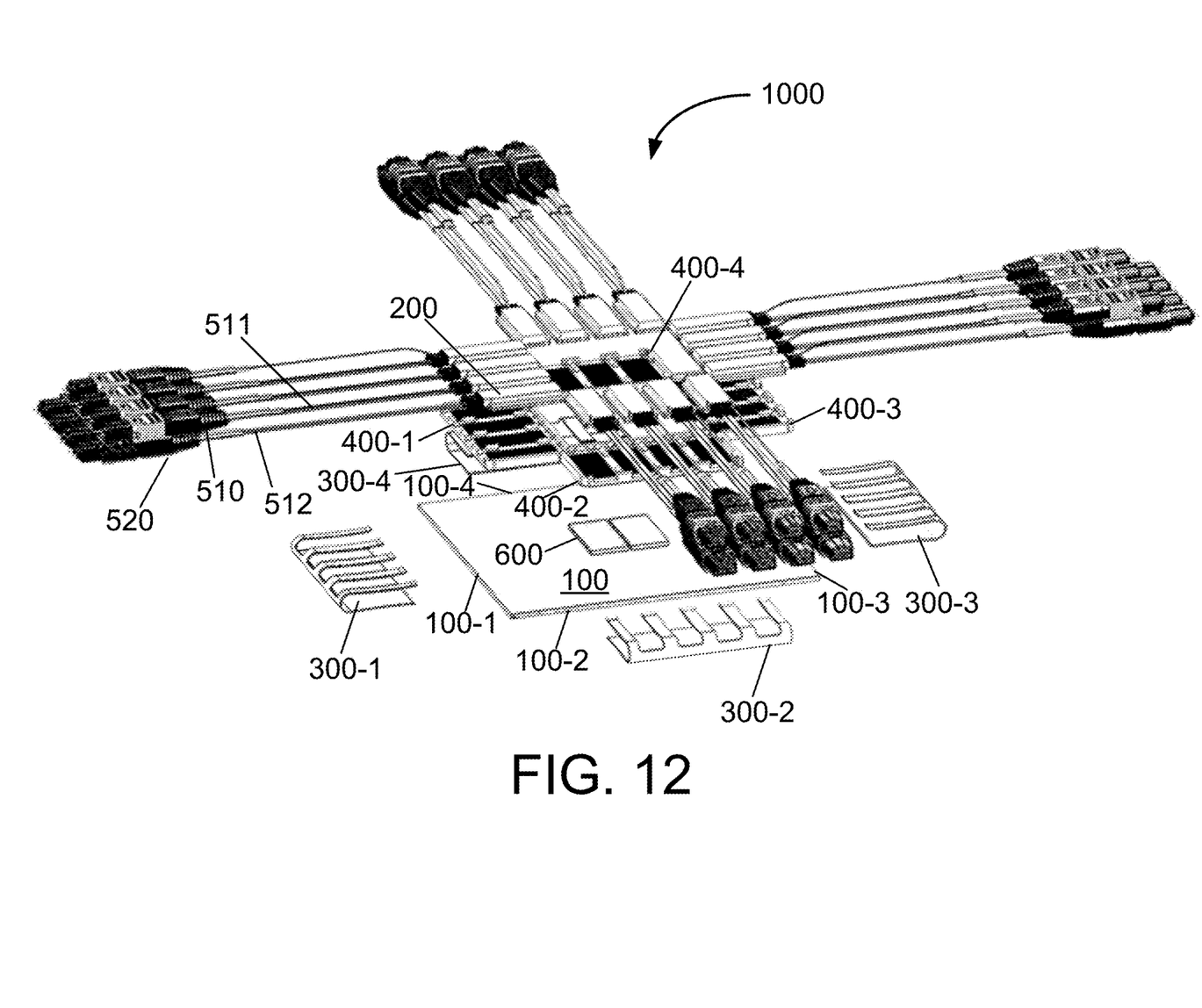
FIG. 12 is an exploded view of the assembled electro-optical switch module of FIG. 1 according to an embodiment of the present invention.

FIG. 12 is an exploded view of the assembled electro-optical switch module of FIG. 1 according to an embodiment of the present invention. This diagram is merely an example, which should not unduly limit the scope of the claims. One of ordinary skill in the art would recognize many variations, alternatives, and modifications. Referring to FIG. 12, in an embodiment, a method for assembling the electro-optical switch module 1000 includes a step of providing a switch package substrate 100 in square shape. Further in the embodiment, the method for assembling the electro-optical switch module 1000 includes a step of disposing a data processor device 600 at a central region of the switch package substrate 100, which is configured to control switching function for total 32×16=512 o/e channels distributed to total 16 co-packaged optical modules 200. Optionally, the data processor device 600 is one switch die with 51.2 Tbits/s capacity. As shown, the 16 co-packaged optical modules 200 are disposed with four groups respectively assembled at four edge regions of the switch package substrate 100, each co-packaged optical module 200 fanning out two optical fiber cables 511 and 512 respectively packaged with two optical pigtails 510 and 520. Detail descriptions of each co-packaged optical module 200 can be found in FIG. 2 and FIG. 3 and corresponding descriptions in this specification.

In an embodiment, the method for assembling the electro-optical switch module 1000 further includes a step of placing an optical socket member on any edge region of the switch package substrate 100. For example, a first optical socket member 400-1 is disposed to a first edge region 100-1. Similarly, a second optical socket member 400-2 is disposed to a second edge region 100-2. A third optical socket member 400-3 is disposed to a third edge region 100-3. A fourth optical socket member 400-4 is disposed to a fourth edge region 100-4. Each optical socket member 400 (FIG. 9) is configured with a plurality of solder bumps at its bottom side. The step of placing the optical socket member includes soldering it onto multiple conducting pads in a top plate of the corresponding edge region of the switch package substrate 100. Each optical socket member 400 includes 4 tightly packed sockets each being designed to allow one optical module 200 to be seated in and to form electrical connection via LGA interposer (see FIG. 9) with the circuits inside the switch package substrate 100 which connects to the data processor device 600.

Furthermore, in the embodiment, the method for assembling the electro-optical switch module 1000 includes a step of disposing each of 4 co-packaged optical modules 200 into one of 4 sockets in the optical socket member 400 at each edge region of the switch package substrate 100. The co-packaged optical module 200, as described in FIG. 2, FIG. 3, and FIG. 6, includes a tile base member having its bottom side pre-fabricated with a plurality of electric contacts. As each co-packaged optical module 200 is disposed into the socket, the plurality of electric contacts is forming connections through the LGA interposer disposed in the socket with electric lines embedded inside the switch package substrate 200 to couple with the data processor device 600. Each co-packaged optical module 200 is disposed in the socket with a fiber outlet fitted through a side notch opening of each socket. Each fiber outlet includes a boot member (seen FIGS. 2-5) to fix two fiber cables 511 and 512 coupled respectively via a vertical coupler for providing laser power and an edge coupler for receiving/delivering input/output optical signals through a PLC block. The two fiber cables are configured as two optical pigtails 510 and 520. Optionally, each optical pigtail is configured with a MPO connector. As seen in the perspective view of FIG. 12, the optical pigtails 510 and 520 of four co-packaged optical modules 200 at each of four edge regions, 100-1 through 100-4, of the switch package substrate 100 are extended perpendicularly outwards from the corresponding edge region.

Moreover, the method for assembling the electro-optical switch module 1000 includes a step of fixing the four co-packaged optical modules 200 loaded in the four sockets of the optical socket member 400 at each edge region of the switch package substrate 100. In an embodiment, a clamp latch member (300-1, 300-2, 300-3, 300-4) per edge region (100-1, 100-2, 100-3, 100-4) is applied by sliding its bottom part below a bottom plate of the switch package substrate 100 and its top part to press on two side edges of the lid cover member of each of the four co-packaged optical modules 200. As shown in FIG. 7 and FIG. 8, the bottom clamp part of each clamp latch member 300 is a continuous sheet piece and the top clamp part includes finger-like sheet pieces for separately clamping four optical modules in respective four sockets. Optionally, it is made by metal sheet with proper curved physical shape to create elastic clamping force for properly secure the optical modules in position.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A co-packaged electro-optical module, comprising:
a planar light circuit block optically coupled to a first set of optical fibers and configured to redirect light received from the first set of optical fibers in a first direction to light directed in a second direction that is different from the first direction, the planar light circuit block being implemented as a waveguide and configured to power split the light provided in the first direction via one of the fibers in the first set of optical fibers to two or more branches of fibers, the two or more branches of fibers each have less power than the one of the fibers in the first set of optical fibers;
an edge coupling element coupled to a second set of optical fibers, the edge coupling element set apart from the planar light circuit block and configured to at least one of receive or transmit optical signals via the second set of optical fibers; and a silicon photonics chip having a surface and an edge, the silicon photonics chip being optically coupled to the planar light circuit block and to the edge coupling element, the silicon photonics chip being configured to:

receive, via the planar light circuit block coupled to the surface, light that is received from the first set of optical fibers and directed by the planar light circuit block in the second direction;

at least one of receive or transmit, via the edge coupling element coupled to the edge, the optical signals communicated using the econd set of optical fibers; and electronically interface with one or more electronic components electrically coupled to the surface of the silicon photonics chip.

2. The co-packaged electro-optical module of claim 1, wherein the silicon photonics chip is configured to receive light power from the light that is directed by the planar light circuit block in the second direction.

3. The co-packaged electro-optical module of claim 1, wherein light of the optical signals is at least one of received or transmitted in a third direction, which is at least one of parallel to the first direction or not parallel to the second direction.

4. The co-packaged electro-optical module of claim 3, wherein:

the third direction is parallel to the first direction; and
the first direction is orthogonal to the second direction.

5. The co-packaged electro-optical module of claim 1, further comprising a base member, wherein:

the one or more electronic components are comprised in one or more integrated circuits;

the silicon photonics chip is implemented as an interposer disposed between the one or more integrated circuits and the base member; and the silicon photonics chip is configured to electrically couple the one or more integrated circuits to the base member.

6. The co-packaged electro-optical module of claim 1, wherein:

the one or more electronic components comprise one or more integrated circuits; and the silicon photonics chip is implemented as an interposer disposed between the one or more integrated circuits and the edge coupling element and electro-optically couples the one or more integrated circuits to the edge coupling element.

7. The co-packaged electro-optical module of claim 1, further comprising a transceiver configured to transmit and receive the optical signals via the edge coupling element and the silicon photonics chip.

8. The co-packaged electro-optical module of claim 7, wherein:

the transceiver comprises the silicon photonics chip and one or more integrated circuits electrically coupled to the silicon photonics chip; and the one or more electronic components are comprised in the one or more integrated circuits.

9. The co-packaged electro-optical module of claim 8, wherein the one or more integrated circuits comprise a plurality of integrated circuits mounted on the silicon photonics chip and comprising at least two of a driver chip, a transimpedance amplifier chip, a controller chip and a processing chip.

10. The co-packaged electro-optical module of claim 1, further comprising:

a base member; and
a processing chip electrically coupled to and mounted on the base member, wherein the silicon photonics chip is electrically coupled to and mounted on the base member.

11. The co-packaged electro-optical module of claim 10, erein the processing chip is flip mounted on the base member.

12. The co-packaged electro-optical module of claim 1, further comprising a base member, wherein:

the edge coupling element and the silicon photonics chip are mounted on the base member; and the planar light circuit block is disposed above the edge coupling element and on the silicon photonics chip, the planar light circuit block being optically coupled to the silicon photonics chip.

13. The co-packaged electro-optical module of claim 1, wherein the silicon photonics chip comprises a silicon Mach-Zehnder modulator, a transimpedance amplifier, and a photodiode.

14. The co-packaged electro-optical module of claim 1, further comprising a base member comprising a plurality of electrical contacts, the plurality of electrical contacts configured to electrically couple the silicon photonics chip to a land grid array.

15. The co-packaged electro-optical nodule of claim 1, wherein the light received from the first set of optical fibers at the planar light circuit block in a first direction is provided to the first set of optical fibers from a laser source external to and separate from the co-packaged electro-optical module.

16. The co-packaged electro-optical module of claim 15, wherein the co-packaged electro-optical module is absent a laser source.

17. The co-packaged electro-optical module of claim 1, wherein the co-packaged electro-optical module is configured, on a same side of the co-packaged electro-optical module, (i) to receive power from the light that is directed by the planar light circuit block in the second direction, and (ii) to at least one of receive or transmit the optical signals.

18. An electro-optical switching assembly comprising:

a package substrate;
the co-packaged electro-optical module of claim 1 mounted on the package substrate; and
a processor mounted on the package substrate and electrically coupled to the co-packaged electro-optical module via the packaged substrate, the processor configured to control switching of optical channels of the. silicon photonics chip, and the optical channels corresponding to respective fibers of the second set of optical fibers.

19. The electro-optical switching assembly of claim 18, further comprising an optical socket member comprising a plurality of sockets, a first socket configured to receive the co--packaged electro--optical module and one or more additional sockets configured to receive one or more additional co-packaged electro-optical modules, the one or more additional co-packaged electro-optical modules electrically coupled to the processor via the package substrate, wherein the processor is configured to control switching of optical channels among the co-packaged electro-optical module and the one or more additional co-packaged electro-optical modules.

20. An electro-optical switching assembly, comprising a package substrate;

a first processor mounted on the package substrate, the first processor configured to control switching among a plurality of optical channels;

a first optical socket member distinct from and coupled to the package substrate, the first optical socket member comprising a plurality of sockets and a plurality of recessed flat regions; and a first plurality of co-packaged electro-optical modules mounted respectively in the plurality of sockets of the first optical socket member and coupled to a respective optical fiber, each of the first plurality of co-packaged electro-optical modules comprising a second processor, a respective silicon photonics interposer electrically coupled to the first processor via the first optical socket member and the package substrate, wherein the first plurality of co-packaged electro-optical modules define the plurality of optical channels controlled by the first processor, and a tile base member providing electrical interconnections between i) the second processor and the respective silicon photonics interposer and ii) a respective one of a plurality of recessed flat regions of the first optical socket member.

21. The electro-optical switching assembly of claim 20, further comprising a plurality of optical socket members not including the first optical socket member, the plurality of optical socket members and the first optical socket member are disposed on the package substrate to surround the first processor and are electrically coupled to the first processor via the package substrate.

22. The electro-optical switching assembly of claim 21, wherein each of the plurality of optical socket members comprises a plurality of sockets configured to receive a respective set of co-packaged electro-optical modules.

23. The electro-optical switching assembly of claim 22, wherein the first plurality of co-packaged electro-optical modules are implemented as a plurality of transceivers.

24. The electro-optical switching assembly of claim 20, wherein respective ones of the first plurality of co-packaged electro-optical modules comprises:

a planar light circuit block optically coupled to a first set of optical fibers;

an edge coupling element optically coupled to a second set of optical fibers; and a respective one of the silicon photonics interposers optically coupled to the planar light circuit block and the edge coupling element and configured to receive power via light from the planar light circuit block, and at least one of receive or transmit optical signals via the edge coupling element.

25. The electro-optical switching assembly of claim 24, wherein for each of the first plurality of co-packaged electro-optical modules:

the planar light circuit block is configured to redirect light received in a first direction from the first set of optical fibers to light directed in a second direction that is different from the first direction; and the edge coupling element is configured to at least one of receive or transmit light of the optical signals in a third direction, which is at least one of parallel to the first direction or not parallel to the second direction.

26. The electro-optical switching assembly of claim 24, further comprising a clamp configured to hold the first optical socket member along an edge of the package substrate.

27. The electro-optical switching assembly of claim 26, wherein:

the clamp comprises fingers; and the fingers are disposed between portions of the first plurality of co-packaged electro-optical modules and are configured to apply pressure to ledges formed in base members of the first plurality of co-packaged electro-optical modules to (i) maintain contact between the base members and the first optical socket member, and (ii) maintain contact between the first optical socket member and the package substrate.

28. The electro-optical switching assembly of claim 20, the first optical socket member is a unitary structure comprising a plurality of notch openings configured to receive respectively the first plurality of co-packaged electro-optical modules.

29. The electro-optical switching assembly of claim 20, further comprising a clip configured to hold the first plurality of co-packaged electro-optical modules to the first optical socket member.

30. The electro-optical switching assembly of claim 29, wherein:

the clip is a single 'U'-shaped clip with fingers; and at least one of the fingers extends over two adjacent ones of the first plurality of co-packaged electro-optical modules.

31. The electro-optical switch assembly of claim 20, wherein:

the plurality of recessed flat regions configured to be coupled respectively to the first plurality of co-packaged electro-optical modules; and a plurality of socket elements arranged between the plurality of recessed flat regions, each of the plurality of socket elements configured to hold down two of the first plurality of co-packaged electro-optical modules.

32. The electro-optical switch assembly of claim 20, wherein:

the silicon photonics interposer is mounted on the tile base member;

the second processor is mounted on the tile base member separate from the silicon photonics interposer; and the tile base member is disposed on a respective one of a plurality of recessed flat regions of the first optical socket member.

33. The electro-optical switch assembly of claim 20, wherein the first plurality of co-packaged electro-optical modules further comprise:

a control chip; and a planar light circuit block optically coupled to at least one of the plurality of optical channels, the planar light circuit block and the control chip being mounted on the silicon photonics interposer.

34. The electro-optical switching assembly of claim 33, wherein each of the first plurality of co-packaged electro-optical modules comprises:

a respective one of the planar light circuit blocks optically coupled to a first set of optical fibers;

an edge coupling element optically coupled to a second set of optical fibers; and a respective one of the silicon photonics interposers optically coupled to the respective one of the planar light circuit blocks and the edge coupling element and configured to receive power via light from the respective one of the planar light circuit blocks, and at least one of receive or transmit optical signals via the edge coupling element.

\* \* \* \* \*